(12) United States Patent
Craun et al.

(10) Patent No.: US 9,856,392 B2
(45) Date of Patent: Jan. 2, 2018

(54) RADIATION CURABLE COATING COMPOSITIONS FOR METAL

(75) Inventors: Gary Pierce Craun, Berea, OH (US); Kenneth James Gardner, Independence, OH (US); Patricia Miller, Cleveland, OH (US)

(73) Assignee: AKZO NOBEL COATINGS INTERNATIONAL B.V., Arnheim (NL)

( * ) Notice: Subject to any disclaimer, the term of this patent is extended or adjusted under 35 U.S.C. 154(b) by 0 days.

(21) Appl. No.: 13/976,763

(22) PCT Filed: Dec. 23, 2011

(86) PCT No.: PCT/EP2011/073929
§ 371 (c)(1),
(2), (4) Date: Jun. 27, 2013

(87) PCT Pub. No.: WO2012/089655
PCT Pub. Date: Jul. 5, 2012

(65) Prior Publication Data
US 2013/0273383 A1    Oct. 17, 2013

Related U.S. Application Data

(60) Provisional application No. 61/427,582, filed on Dec. 28, 2010.

(30) Foreign Application Priority Data

Feb. 10, 2011    (EP) .................................... 11154036

(51) Int. Cl.
| | |
|---|---|
| B32B 15/08 | (2006.01) |
| C08F 2/08 | (2006.01) |
| C09D 133/04 | (2006.01) |
| C09D 4/00 | (2006.01) |
| C09D 133/14 | (2006.01) |
| C09D 175/16 | (2006.01) |
| C08G 18/67 | (2006.01) |
| C08F 220/18 | (2006.01) |
| C08F 222/10 | (2006.01) |
| C08F 230/02 | (2006.01) |

(52) U.S. Cl.
CPC ......... *C09D 133/04* (2013.01); *C08G 18/672* (2013.01); *C09D 4/00* (2013.01); *C09D 133/14* (2013.01); *C09D 175/16* (2013.01); *C08F 220/18* (2013.01); *C08F 222/1006* (2013.01); *C08F 230/02* (2013.01); *C08G 2390/40* (2013.01); *Y10T 428/31692* (2015.04); *Y10T 428/31699* (2015.04)

(58) Field of Classification Search
None
See application file for complete search history.

(56) References Cited

U.S. PATENT DOCUMENTS

| | | |
|---|---|---|
| 3,929,929 A | 12/1975 | Kuehn |
| 4,025,548 A | 5/1977 | Huemmer et al. |
| 4,153,778 A | 5/1979 | Park et al. |
| 4,452,374 A | 6/1984 | Hitchcock et al. |
| 4,508,916 A | 4/1985 | Newell et al. |
| 4,522,961 A | 6/1985 | Martino et al. |
| 4,607,084 A | 8/1986 | Morris |
| 5,128,387 A | 7/1992 | Shustack |
| 5,128,391 A * | 7/1992 | Shustack ......................... 522/92 |
| 5,578,693 A | 11/1996 | Hagstrom et al. |
| 6,090,886 A | 7/2000 | Konno et al. |
| 6,306,468 B1 | 10/2001 | Maddox et al. |
| 6,433,091 B1 * | 8/2002 | Cheng ........................... 525/191 |
| 6,696,106 B1 | 2/2004 | Schultz et al. |
| 6,743,879 B1 | 6/2004 | Smith |
| 6,924,377 B2 | 8/2005 | Blazecka et al. |
| 6,989,407 B2 | 1/2006 | Lapin |
| 2001/0002286 A1 | 5/2001 | Madigan |
| 2002/0172760 A1 | 11/2002 | An et al. |
| 2003/0004231 A1 | 1/2003 | Ehmann et al. |
| 2003/0066600 A1 | 4/2003 | Kauffman et al. |
| 2003/0079333 A1 | 5/2003 | Guthrie et al. |
| 2003/0148257 A1 | 8/2003 | Berkowitz et al. |

(Continued)

FOREIGN PATENT DOCUMENTS

| | | |
|---|---|---|
| CN | 1803942 A | 7/2006 |
| CN | 101096472 A | 1/2008 |

(Continued)

OTHER PUBLICATIONS

European Search Report dated Mar. 22, 2011 for related EP Application No. 11154036.5.
International Search Report and Written Opinion dated May 21, 2013 for related PCT Application No. PCT/EP2011/073929.
International Search Report and Written Opinion dated May 17, 2013 for related PCT Application No. PCT/EP2011/073931.
Enomoto et al., "Direct coating on the stainless steel by electron beam curing," English abstract, Tokyo-toritsu Aisotopu Sogo Kenkyusho Journal, 1995, vol. 12, pp. 61-66.
Gould, Michael, Electron Beam-Curing Laminating Adhesives, Internet Article , Aug. 1, 2010.
Lee et al, "Influence of isocyanate type of acrylated urethane oligomer and of additives on weathering of UV-cured films," Internet Article PD&S vol. 91 (2006), 1025-1035.
English abstract of CN 101117458 A published Feb. 6, 2008.
English abstract of JP 60-53570 A published Mar. 27, 1985.
English abstract of JP 10-204325 A published Aug. 4, 1998.

(Continued)

*Primary Examiner* — Sheeba Ahmed
(74) *Attorney, Agent, or Firm* — Alice C. Su

(57) ABSTRACT

Various embodiments of radiation curable coating compositions are provided. In one embodiment, a radiation curable coating composition includes a (meth)acrylate functional compound and an adhesion promoting (meth)acrylate compound. The radiation curable coating composition can also include a (meth)acrylate functional compound, a poly(meth)acrylate and a reactive diluent. The (meth)acrylate functional compound can be made from the reaction of a multifunctional isocyanate, a polyol and a hydroxyl functional (meth)acrylate in the presence of a catalyst.

21 Claims, No Drawings

(56) References Cited

U.S. PATENT DOCUMENTS

| | | | |
|---|---|---|---|
| 2003/0217808 A1* | 11/2003 | Woods | C09J 4/00 |
| | | | 156/332 |
| 2004/0097611 A1 | 5/2004 | Nienhaus et al. | |
| 2004/0180933 A1 | 9/2004 | Brown et al. | |
| 2004/0214021 A1 | 10/2004 | Guthrie et al. | |
| 2005/0119438 A1 | 6/2005 | Leon et al. | |
| 2005/0209361 A1 | 9/2005 | Detrembleur et al. | |
| 2006/0000545 A1 | 1/2006 | Nageli et al. | |
| 2006/0047085 A1 | 3/2006 | Trivedi | |
| 2006/0052523 A1 | 3/2006 | Bushendorf et al. | |
| 2007/0088111 A1 | 4/2007 | Maksimovic et al. | |
| 2007/0264464 A1 | 11/2007 | Ito et al. | |
| 2009/0012202 A1 | 1/2009 | Jacobine et al. | |
| 2009/0047531 A1 | 2/2009 | Bartley et al. | |
| 2009/0053520 A1 | 2/2009 | Lu et al. | |
| 2009/0118428 A1 | 5/2009 | Ougitani et al. | |
| 2009/0176907 A1 | 7/2009 | Subramanian et al. | |
| 2009/0318581 A1 | 12/2009 | Ota et al. | |
| 2010/0056662 A1* | 3/2010 | Spyrou | C08G 18/4216 |
| | | | 522/96 |
| 2013/0103157 A1* | 4/2013 | Kourtis | A61F 2/30 |
| | | | 623/18.11 |

FOREIGN PATENT DOCUMENTS

| | | |
|---|---|---|
| CN | 101117458 A | 2/2008 |
| EP | 0 062 385 A2 | 10/1982 |
| EP | 1 818 349 A1 | 8/2007 |
| EP | 2 080 790 A1 | 7/2009 |
| JP | 60-53570 A | 3/1985 |
| JP | 60-112865 A | 6/1985 |
| JP | S63-92618 A | 4/1988 |
| JP | 9-31150 A | 2/1997 |
| JP | 10-204325 A | 8/1998 |
| JP | 2000-297112 A | 10/2000 |
| JP | 2001-38452 A | 2/2001 |
| JP | 2009-102208 A | 5/2009 |
| KR | 10-0725249 B1 | 5/2007 |
| KR | 2009-0072262 | 7/2009 |
| WO | WO 94/12554 A1 | 6/1994 |
| WO | 02/22751 A1 | 3/2002 |
| WO | 2007/120148 A1 | 10/2007 |
| WO | 2008/003191 A1 | 1/2008 |
| WO | 2008/037535 A1 | 4/2008 |
| WO | 2008/076303 A1 | 6/2008 |
| WO | WO 2008/151286 A1 | 12/2008 |
| WO | WO 2009/089001 A2 | 7/2009 |
| WO | 2010/055507 A2 | 5/2010 |

OTHER PUBLICATIONS

English abstract of JP 2001-38452 A published Feb. 13, 2001.
English abstract of KR 10-0725249 B1 published May 29, 2007.
English abstract of KR 2009-0072262 published Jul. 2, 2009.
English abstract of JP 60-112865 A published Jun. 19, 1985.
English abstract of JP 9-31150 A published Feb. 4, 1997.
English abstract of JP 2000-297112 A published Oct. 24, 2000.
Khudyakov, Igor V., "UV-Light-Sensitive Urethane Acrylate Oligomers," Bomar Specialties, Winstead, Conn., internet article posted Mar. 1, 2005.
Sartomer Product Bulletin, "Urethane Acrylate Oligomers," Internet article May 2010.
Office Action issued in European Application No. 11 802 104.7 dated Jun. 5, 2014.
Guideline for Examination (EPO), http://www.epo.org/law-practice/legal-texts/html/guidelines/e/f_iii_1.htm, retrieved on Sep. 22, 2016.
Polyether Urethane Methacrylates, http://www.dymax-oc.com/index.php/oligomers/polyether-urethane-methacrylates, retrieved on Sep. 22, 2016.
Sartomer Company Material Safety Data Sheet, http://www.chemcas.com/msds_archive/part2/cas/gr_msds/sartmer_com—0000be21.asp, retrieved on Sep. 22, 2016.
Sartomer Arkema Group, Adhesion promoters, http://emea.sartomer.com/enl/products/sarbox, retrieved on Sep. 22, 2016.
SiSiB® PC4100, http://www.powerchemcorp.com/silanes/4100.html, retrieved on Sep. 22, 2016.
Notice of Opposition to a counterpart EP Application No. 11802104.7 on Oct. 4, 2016.

* cited by examiner

RADIATION CURABLE COATING COMPOSITIONS FOR METAL

This application is the U.S. National Phase of PCT/EP2011/073929 filed on Dec. 23, 2011 and claims the benefit of U.S. Provisional Application No. 61/427,582 filed on Dec. 28, 2010 and European Application No. 11154036.5 filed on Feb. 10, 2011, the entire contents of each of which are incorporated herein by reference.

BACKGROUND OF THE INVENTION

The present disclosure relates to radiation curable coating compositions that can provide useful coatings and coated surfaces for packaging materials such as metal cans. Currently available radiation curable coatings such as those that cure through ultra-violet ("UV") radiation or electron beam ("EB") radiation have a tendency to be inflexible cured coatings that are prone to higher levels of shrinkage. Consequently, coatings utilizing chemistry for such curing have been heretofore recognized by those skilled in the art to be inadequate in terms of direct to metal adhesion, formability, and retort resistance as well as limited in application in terms of adhesion and extensibility within the flexible packaging industry. Attempts to address these concerns can lead to disadvantages of relying on either; (1) processes which require high temperature flash before initiating the radiation cure, as in polyurethane dispersions ("PUD's"), (2) cationic chemistry, which suffers the disadvantage of humidity inhibition of cure, photoinitiator, and currently, high cost due to supply issues, (3) application of high temperature bake, post radiation cure, and/or application of prime coat, to confer adhesion, and/or (4) reliance on conventional solvent and waterborne thermoset chemistries which regress to the disadvantages of releasing volatile organic compounds ("VOCs"), BADGE/NOGE moieties. Thus, any composition which addresses one or more of these issues, while also dispensing with one or more of these disadvantages in radiation cure coatings chemistry would provide one or more benefits for use while positively impacting safety, health, and environmental concerns.

While adhesion promoters are known in the art, it is surprising that higher levels of these compounds than normally used in supplier literature or other published information offer such a significant improvement in adhesion and do not cause severe problems with blush resistance of the cured coating. Higher levels are especially useful on "cleaned only" metal substrates without pretreatment and chrome free substrates.

SUMMARY OF THE INVENTION

The present invention includes radiation curable coating compositions comprising a (meth)acrylate functional compound and an adhesion promoting (meth)acrylate compound as well as radiation curable coating compositions comprising a (meth)acrylate functional compound, a poly(meth)acrylate and a reactive diluent. The present invention also includes packaging comprising: a metal substrate; and a radiation curable coating composition disposed on the substrate.

Further, the present invention includes methods of coating a packaging comprising: a) preparing a radiation curable coating composition as described herein; and b) applying the coating composition to the packaging. The radiation curable coatings of the present invention have been found to be hard, flexible and exhibit good adhesion to metal substrates. The coated films of the present invention can withstand retort conditions with minimal blush and minimal loss of adhesion.

DETAILED DESCRIPTION OF THE INVENTION

The present invention includes radiation curable coating compositions comprising a (meth)acrylate functional compound and an adhesion promoting (meth)acrylate compound as well as radiation curable coating compositions comprising a (meth)acrylate functional compound, a poly(meth)acrylate and a reactive diluent. The (meth)acrylate functional compound can be made for non-limiting example from the reaction of a multifunctional isocyanate, a polyol and a hydroxyl functional (meth)acrylate in the presence of a catalyst. The (meth)acrylate functional compound and the adhesion promoting (meth)acrylate compound may each be a monomer, an oligomer, or combination thereof, and references to a monomer are understood to include an oligomer and vice-versa.

In some embodiments, the (meth)acrylate functional compound is present in an amount up to about 50 wt % of the coating composition. The (meth)acrylate functional compounds can be made from various materials known in the art, such as and without limitation, a (meth)acrylate functional polyester, a (meth)acrylate functional polyacrylate, a (meth)acrylate functional polyether, a (meth)acrylate functional polycarbonate, an oil polyol ether, a (meth)acrylate functional urethane, a (meth)acrylate functional compound of WO 2008/151286 (the contents of which are incorporated herein by reference), or a combination thereof. One possible (meth)acrylate functional compound is a urethane, made readily but not exclusively from the reaction of a multifunctional isocyanate, a polyol and a hydroxyl functional (meth)acrylate in the presence of a catalyst.

The adhesion promoting (meth)acrylate compound may be for non-limiting example a phosphate (meth)acrylic-functional monomer, a carboxylate (meth)acrylic-functional monomer, a phosphate (meth)acrylic-functional oligomer, a carboxylate (meth)acrylic-functional oligomer, or a combination thereof. In some embodiments, the phosphate (meth)acrylic-functional monomer may include phosphate esters or hydroxyl functional esters of methacrylic acid. The carboxylate (meth)acrylic-functional monomer/oligomer may include without limitation carboxylic acid functional esters, carboxylic acid functional ethers and combinations thereof. In certain embodiments of the invention, the phosphate (meth)acrylic-functional monomer/oligomer may be present in an amount up to about 12 wt % of the coating composition. The carboxylate (meth)acrylic-functional monomer/oligomer may be present in an amount from about 0.5 to about 50 wt % of the coating composition.

The adhesion promoting (meth)acrylate compound may be present in an amount up to about 65 wt % of the total coating composition film forming components.

In some embodiments of the invention, the poly(meth)acrylate is present in an amount up to about 25 wt % of the coating composition or from about 5 to about 15 wt %. The poly(meth)acrylate may include without limitation tricyclodecyl dimethanol diacrylate, dipropylene glycol diacrylate, and the like, as well as combinations thereof.

The reactive diluent can be present in an amount up to about 95 wt % of the coating composition or from about 20 to about 60 wt %. The reactive diluent may include without limitation a mono(meth)acrylate.

Multifunctional isocyanates for use in the present invention include but are not limited to an isocyanate, a di-isocyanate, a poly-isocyanate, an aliphatic isocyanate, an aromatic isocyanate, di-hexamethylene, poly-hexamethylene, hexane diisocyanate, isophorane, MDI, and combinations thereof.

Polyols for use in the present invention include but are not limited to polyesters, diols, alcohols, polycarbonates, polypropylene glycol, polyethylene glycol, polytetramethylene oxide, and combinations thereof. In some embodiments of the invention, the polyol has a molecular weight of about 100 to about 10,000, or about 500 to about 5000.

Suitable hydroxyl functional (meth)acrylates include but are not limited to a hydroxyl monomer, 4-hydroxy butyl (meth)acrylate, butane diol mono-(meth)acrylate, hydroxy propyl (meth)acrylate, hydroxy ethyl (meth)acrylate, an extended hydroxyl (meth)acrylate, polycaprolactone (meth)acrylate, and combinations thereof. The amount of the hydroxyl functional (meth)acrylate can range from about 5% to about 95% by weight based on the weight of the (meth)acrylate functional compound, and in other examples from about 25% to about 75% by weight based on the weight of the (meth)acrylate functional compound.

In some embodiments of the invention, the molar ratio of multifunctional isocyanate/polyol/hydroxyl functional (meth)acrylate is about 1/0.1-2/0.2-5, about 1/0.25-0.75/0.5-2.5, or about 1/0.5/2. On a weight basis, the ratio can be about 1 to about 75% of the multifunctional isocyanate to up to about 90% of the polyol to about 1 to about 99% of the hydroxyl functional (meth)acrylate. In some embodiments, there is a slight excess of hydroxyl functionality over isocyanate functionality which allows the reaction to proceed to at least 99% conversion of the multifunctional isocyanate.

Additional hydroxyl functional materials can be included with the hydroxyl functional (meth)acrylate. Additional hydroxy functional materials can include but are not limited to alcohols, diols, polyols, polyesters, polyethers (such as for non-limiting example, benzyl alcohol, trimethylol propane, polypropylene glycol, hexane diol), and combinations thereof.

The catalyst can be a catalyst suitable for polymerization such as without limitation a tin catalyst such as dibutyl tin di-laurate or dibutyl tin oxide, a zirconium catalyst such as zirconium propionate, a bismuth catalyst such as bismuth neodecanoate, a tertiary amine catalyst such as triethylene diamine, or a combination thereof. The amount of the catalyst can range from about 1 ppm to about 10,000 ppm, from about 10 ppm to about 1,000 ppm, or from about 20 ppm to about 200 ppm. It is generally convenient to employ the catalyst in the form of a solution in an organic solvent. Examples of suitable solvents include without limitation aromatic hydrocarbon solvents, cycloaliphatic polar solvents (such as cycloaliphatic ketones including cyclohexanone), polar aliphatic solvents (such as alkoxyalkanols including 2-methoxyethanol), the diol starting material, and combinations thereof.

An air atmosphere and an effective inhibitor such as for example methoxy hydroquinone, hydroquinone, di-tert butyl hydroquinone, butylated hydroxyl toluene, phenothiazine, or a combination thereof can be used to prevent free radical polymerization of the hydroxyl functional (meth)acrylate monomer/oligomer. The inhibitor may be present in an amount of about 10 to about 10,000 ppm. The reaction of the multifunctional isocyanate, the polyol and the hydroxyl functional (meth)acrylate can be carried out at a temperature that ranges from about ambient temperature to about 70° C. or about 110° C., an in other examples from about 90° C. to about 100° C. Typically, at least 90% conversion, and in some embodiments at least 99% conversion of the isocyanate groups can be obtained in about 1 hour at 90° C. Additionally, a diluent may be added during the reaction to reduce viscosity, such as for non-limiting example a free radical reactive species such as a (meth)acrylate, a methyl (meth)acrylate, isobornyl (meth)acrylate, t-butyl cyclohexyl (meth)acrylate, tricyclodecyl dimethanol di(meth)acrylate, or a combination thereof. The diluent may be present in an amount up to about 75% or more of the total batch weight.

Various embodiments of the present invention provide radiation cured coating compositions that are essentially free of BADGE and NOGE even when cured with low energy curing, such as electron beam curing. The various radiation cured coating compositions described herein have improved flexibility and are, for example, more flexible than coatings with other (meth)acrylate coatings. The coating compositions of the present invention can also provide retort resistance for rigid packaging applications according to the most common retort tests know for rigid packaging applications. The curable coating compositions of the present invention can be used without the need for a prime coat so as to be in direct contact to metal substrates. The coating compositions can be applied to substrates in any manner known to those skilled in the art.

The following examples are given for the purpose of illustrating the described systems and processes and should not be construed as limitations on the scope or spirit thereof.

EXAMPLES

Example 1

Preparation of a Urethane Oligomer

In a 1 liter flask, 99 g of Bayer N-3900 was mixed with 200 g of polypropylene glycol 2000, 153 g of isobornyl acrylate, 57.6 g of 4-hydroxy butyl acrylate and 0.15 g of phenothiazine. The mixture was placed in a 90 ° C. hot water bath under an air blanket and stirred. To the resulting mixture, 0.5 ml of a 10% solution of di-butyl tin di-laurate in methyl ethyl ketone was added. The resulting mixture was held for 2 hours then cooled.

Example 2

The following ingredients were added under agitation while a mixing operation was done under medium speed agitation. The finished coating was drawn down over a metal substrate and cured under electron beam at a minimum setting of 3 megarads per 90 kilovolts.

| | Weight Percent of Formulation | | | | | | | | | |
|---|---|---|---|---|---|---|---|---|---|---|
| | A | B | C | D | E | F | G | H | I | J |
| Oligomer | 0 | 4 | 40.45 | 0 | 40 | 25.33 | 54 | 53.7 | 53.4 | 52.2 |
| Laromer TBCH | 57 | 55 | 34.4 | 34.4 | 21.7 | 44.37 | 36 | 35.8 | 35.6 | 34.8 |
| SR 833 - ADCP | 16 | 15 | 9.11 | 9.11 | 21.8 | 10.8 | 0 | 0.5 | 0.5 | 0.5 |
| Generad 40 | 4 | 4 | 2.5 | 2.5 | 1.7 | 3.1 | 0 | 0 | 0.5 | 0.5 |

-continued

| Weight Percent of Formulation | | | | | | | | | | |
|---|---|---|---|---|---|---|---|---|---|---|
| | A | B | C | D | E | F | G | H | I | J |
| Photomer 4046 | 9 | 9 | 5.3 | 45.75 | 3.6 | 5.8 | 0 | 0 | 0 | 2 |
| Lubricant | 14 | 13 | 8.24 | 8.24 | 11.2 | 10.6 | 10 | 10 | 10 | 10 |
| Total | 100 | 100 | 100 | 100 | 100 | 100 | 100 | 100 | 100 | 100 |
| adhesion | | | | | | | | | | |
| direct to metal* Erichsen Cup | 5 | 5 | 5 | 5 | 5 | 5 | 0 | 0 | 0 | 3 |
| Formation* Retort Blush | 4 | 4 | 3 | 5 | 3 | 3 | 0 | 0 | 0 | 3 |
| 60 mins @ 262 F.** | 3 | 3 | 3 | 5 | 3 | 3 | 0 | 0 | 0 | 2 |
| Pencil Hardness | 2 H | 2 H | 2 H | 3 H | 2 H | 2 H | N/A | N/A | N/A | H |

*Rating 0-5, 5 = excellent
**Blush ratings: 5 - no blush, 4 - very slight, 3 - slight, 2 - blushed, 1 and 0 - failure

We claim:

1. A radiation curable coating composition comprising:
   a) a (meth)acrylate functional compound that includes a (meth)acrylate functional polyether urethane; and
   b) an adhesion promoting (meth)acrylate compound.

2. The coating composition of claim 1, wherein the adhesion promoting (meth)acrylate compound is present in an amount of about 2% to about 40% by weight.

3. The coating composition of claim 1, wherein the (meth)acrylate functional compound is present in an amount of about 0.5 to about 45 wt % of the coating composition.

4. The coating composition of claim 1, wherein the (meth)acrylate functional polyether urethane is made from the reaction of a multifunctional isocyanate, a polyol and a hydroxyl functional (meth)acrylate in the presence of a catalyst.

5. The coating composition of claim 4, wherein the molar ratio of multifunctional isocyanate/polyol/hydroxyl functional (meth)acrylate is about 1/0.1-2/0.2-5.

6. The coating composition of claim 4, wherein the hydroxyl functional (meth)acrylate comprises a hydroxyl monomer, 4-hydroxy butyl (meth)acrylate, butane diol mono-(meth)acrylate, hydroxy propyl (meth)acrylate, hydroxy ethyl (meth)acrylate, an extended hydroxyl (meth) acrylate, polycaprolactone (meth)acrylate, or a combination thereof.

7. The coating composition of claim 4, wherein the multifunctional isocyanate comprises an isocyanate, a di-isocyanate, a poly-isocyanate, an aliphatic isocyanate, an aromatic isocyanate, di-hexamethylene, poly-hexamethylene, hexane diisocyanate, isophorane, MDI, or a combination thereof.

8. The coating composition of claim 4, wherein the polyol comprises a polyester, a diol, an alcohol, a polycarbonate, polypropylene glycol, polyethylene glycol, polytetramethylene oxide, or a combination thereof.

9. The coating composition of claim 4, wherein the catalyst comprises a tin catalyst, dibutyl tin di-laurate, dibutyl tin oxide, a zirconium catalyst, zirconium propionate, a bismuth catalyst, bismuth neodecanoate, a tertiary amine, triethylene diamine, or a combination thereof.

10. The coating composition of claim 1, further comprising at least one multifunctional (meth)acrylate.

11. A packaging comprising: a metal substrate; and the radiation curable coating composition of claim 1.

12. The packaging of claim 11, wherein the radiation curable coating composition directly contacts the metal substrate without a prime coat.

13. A method of coating a packaging comprising: a) preparing the radiation curable coating composition of claim 1; and b) applying the radiation curable coating composition to the packaging.

14. The method of claim 13, wherein the packaging is a metal substrate.

15. The coating composition of claim 1, wherein the adhesion promoting (meth)acrylate compound comprises a phosphate (meth)acrylic-functional monomer, a carboxylate (meth)acrylic-functional monomer, a phosphate (meth) acrylic-functional oligomer, a carboxylate (meth)acrylic-functional oligomer, or a combination thereof.

16. The coating composition of claim 1, wherein the adhesion promoting (meth)acrylate compound includes a carboxylate (meth)acrylic- functional compound.

17. the coating composition of claim 4, wherein the molecular weight of the polyol is 100 to 10,000.

18. The coating composition of claim 15, wherein the phosphate (meth)acrylic-functional monomer is a phosphate ester of (meth)acrylic acid.

19. The coating composition of claim 16, wherein the carboxylate (meth)acrylic-functional compound is a carboxylic functional (meth)acrylate ester, a carboxylic functional (meth)acrylate ether, or a combination thereof.

20. The coating composition of claim 15, wherein the phosphate (meth)acrylic-functional monomer is present in an amount up to about 12 wt % of the coating composition.

21. The coating composition of claim 16, wherein the carboxylate (meth)acrylic-functional compound is present in an amount from about 0.5 to about 50 wt % of the coating composition.

* * * * *